(12) United States Patent
Kaji

(10) Patent No.: US 8,027,056 B2
(45) Date of Patent: Sep. 27, 2011

(54) IMAGE PROCESSING APPARATUS AND CONTROL METHOD THEREOF

(75) Inventor: Hajime Kaji, Abiko (JP)

(73) Assignee: Canon Kabushiki Kaisha (JP)

( * ) Notice: Subject to any disclaimer, the term of this patent is extended or adjusted under 35 U.S.C. 154(b) by 740 days.

(21) Appl. No.: 12/168,367

(22) Filed: Jul. 7, 2008

(65) Prior Publication Data

US 2009/0009819 A1    Jan. 8, 2009

(30) Foreign Application Priority Data

Jul. 6, 2007  (JP) ................. 2007-178806

(51) Int. Cl.
*G06F 15/00* (2006.01)
*B41J 29/38* (2006.01)

(52) U.S. Cl. .......................... 358/1.2; 347/13

(58) Field of Classification Search .......... 358/1.15, 358/1.2, 498, 296, 1.1, 1.14, 539, 1.8, 505, 358/474, 502, 1.9; 382/100, 276, 236, 299, 382/284, 233, 181, 190; 348/207.2, 572, 348/294, 374, 296, 239; 347/5, 12, 13, 42, 347/86, 108; 370/218, 355; 355/18

See application file for complete search history.

(56) References Cited

U.S. PATENT DOCUMENTS

2007/0248278 A1 * 10/2007 Kitamura .................. 382/266

FOREIGN PATENT DOCUMENTS

JP    2000-238342 A    9/2000
JP    3539283 B2       4/2004

* cited by examiner

*Primary Examiner* — Saeid Ebrahimi Dehkordy

(74) *Attorney, Agent, or Firm* — Rossi, Kimms & McDowell LLP

(57) ABSTRACT

An image area of a main scanning line is segmented into a plurality of regions, with a first image being formed that has a first number of pixels in each of the plurality of regions, and a second image being formed that has a second number of pixels in each of the plurality of regions that differs from the first number of pixels. A scaling factor of an image in each of the plurality of regions is derived thereafter, in accordance with a difference in size between the first image and the second image in each region, and a differential between the first number of pixels and the second number of pixels. A determination is made with respect to a number of pixels to be either added to, or subtracted from, each of the plurality of regions, in accordance with a total number of correction pixels in order to adjust the size of the image of the main scanning line, and the scaling factor. The image data of each of the plurality of regions is corrected in accordance with the determined number of pixels in each region.

13 Claims, 11 Drawing Sheets

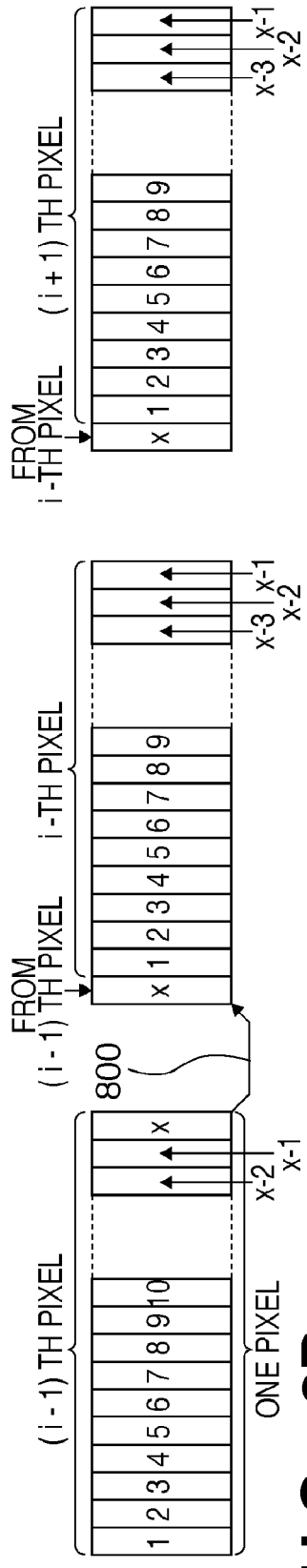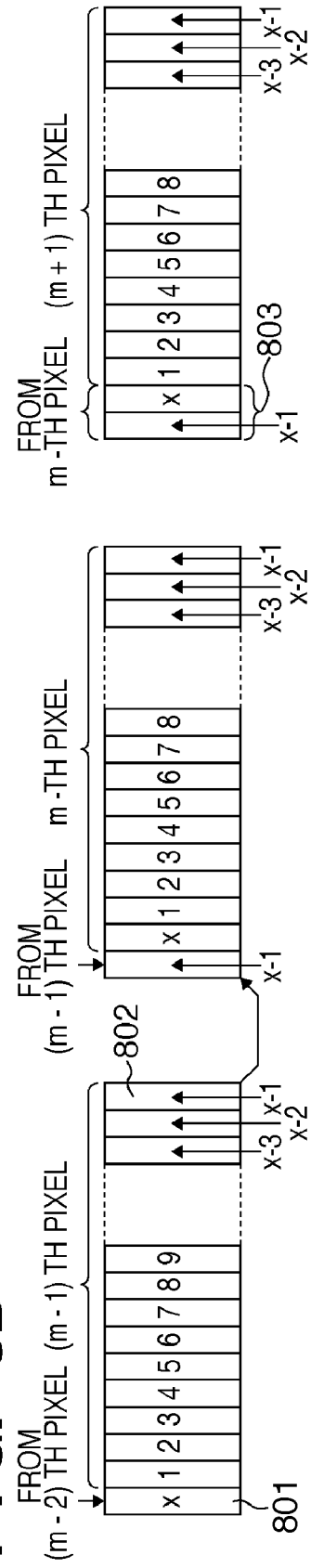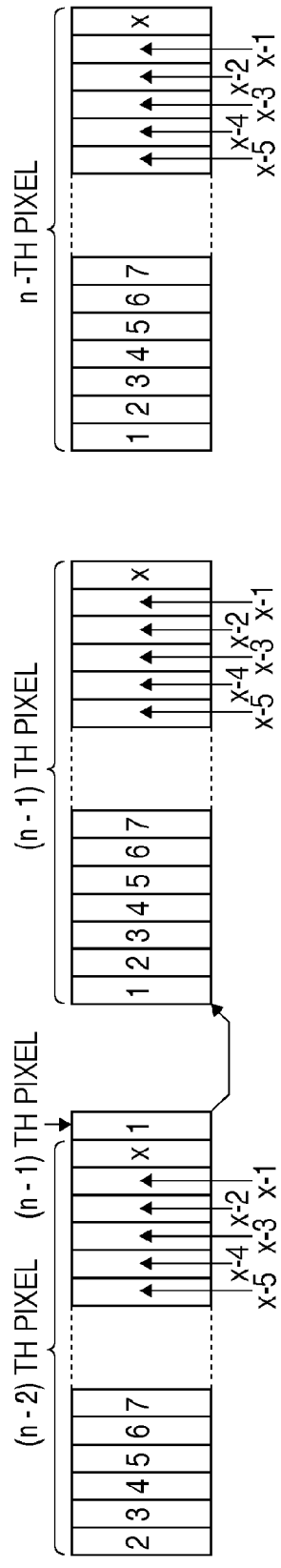

| REGION | 91 | 92 | 93 | 94 | 95 | 96 |
|---|---|---|---|---|---|---|
| NUMBER OF SUPPLEMENTAL PIXELS | 32 | 32 | 32 | 32 | 32 | 32 |
| AQUANTITY OF SCALING | 45 | 40 | 25 | 23 | 27 | 47 |
| SCALING FACTOR | 1.4 | 1.25 | 0.78 | 0.71 | 0.84 | 1.47 |

IMAGE PROCESSING APPARATUS AND CONTROL METHOD THEREOF

BACKGROUND OF THE INVENTION

1. Field of the Invention

The present invention relates to an image processing apparatus and a control method thereof, which, as an instance, generate an image data that is printed with an electrophotographic printer.

2. Description of the Related Art

In recent times, a rapid adoption of color printing on the part of inkjet printers has been followed by a similar shift from black-and-white to color on the part of electrophotographic printer apparatuses, that is, copying machines or printers.

In general, electrophotographic printer apparatuses can be divided into two major types: a single drum type and a tandem type. A printer of the single drum type comprises a plurality of color developers in a periphery of an image carrier, that is, a photosensitive drum, wherein each respective developer supplies a toner of each respective color to form a color composite toner image upon the image carrier, and a color image is formed upon a sheet by transferring the color composite toner image. A printer of the tandem type, conversely, forms a toner image of a single color upon each of a plurality of image carriers, that is, photosensitive drums, that are installed in a side-by-side arrangement, and forms the color composite toner image upon the sheet that is conveyed by transferring each respective single color toner image upon the sheet in a sequence.

A comparison of the single drum type and the tandem type of printers reveals that the single drum type of printer has an advantage over the tandem type of printer, in that an image forming unit of the single type of printer can be made smaller, and is less expensive, than the tandem type of printer, owing to the fact that the single drum type of printer includes a single image carrier. On the other hand, the single drum type of printer is not suited to increasing performance speed, owing, again, to the fact that it employs the single image carrier to form the color image by repeating the image formation over a plurality of iterations. Conversely, while the tandem type of printer is inferior to the single drum type of printer with regard to the miniaturization and cost aspects, it is suited to increasing performance speed, owing to the fact that it is capable of performing the image forming independently for each respective color, and thus, it is possible to form the image in a single pass. Accordingly, in recent times, the tandem type of printer has attracted considerable attention with respect to the color printer, because it is possible to obtain an image forming speed thereby that is on a par with an image forming speed of a black-and-white printer.

With respect to the tandem type of printer, the color image is formed with the plurality of image carriers and a plurality of lasers, and it is accordingly desirable for a distance from each laser light source to each image carrier to be an equal distance in each instance. In actuality, however, a discrepancy in the scale between respective images that are formed thereby may arise as a result of such as a discrepancy in the distance from each respective laser light source to each respective corresponding image carrier, which may not be constant in every instance because of such as a mounting tolerance of each respective unit, or a discrepancy in the wavelength of each respective laser.

Conventionally, in order to compensate for the scaling discrepancy thereof, a method has been proposed that corrects a location of a lens of a laser optic system, or that varies a drive frequency of the laser. Furthermore, in recent times, a method has been proposed that corrects the discrepancy in the scale between each respective image by expanding or reducing the image by either introducing a pixel (hereinafter "supplemental pixel") to the image, or deleting a pixel from the image, such as is disclosed in Japanese Patent No. 3,539,283.

With respect to a conventional tandem type of printer, the discrepancy in the distance from each respective laser light source to each respective corresponding image carrier is large, and as a consequence, the method is employed therein of corrects the location of the lens of the laser optic system, or that varies the drive frequency of the laser.

Such correction, however, employs an optical element such as an f-θ lens that is located between each respective laser light source and each respective corresponding image carrier, which, in addition, must be controlled with a high degree of precision. As a consequence, complex configuration and control are required, resulting in a comparatively more costly configuration.

Such as a dedicated LSI chip is also required when modulating the frequency, in which instance the cost would also increase.

In addition, Japanese Patent Application Laid Open No. 2000-238342 proposes another method for scale correction, wherein the scale correction is performed by introducing a blank pixel within one line of image data, in order to lengthen an image. Furthermore, in recent time, a printer is conceived of wherein the scale correction of an image is performed by segmenting a pixel of image data, and either inserting a segmented pixel (supplemental pixel) into the pixel, or else deleting a segmented pixel from the pixel.

When performing the scale correction by way of either such technique, however, the correction thereof extends only to the correction of the single line as a whole, in the main scanning direction, and does not take into account a lengthening or a contraction of the image in each respective region within the single line thereof, which may result from such as an optical characteristic thereof. As a consequence, a problem occurs wherein a degradation of the image may arise, owing to the lengthening or the contraction of the image in each respective region within the single line thereof.

SUMMARY OF THE INVENTION

An aspect of the present invention is to eliminate the above-mentioned problems with the conventional technology.

An aspect of the present invention is to provide an image processing apparatus and a control method thereof that control such that the size of an image that is formed in each respective main scanning line is uniform, by detecting the optical characteristic of the main scanning line and either introducing or deleting a pixel in accordance with the optical characteristic of the main scanning line thus detected.

According to an aspect of the present invention, there is provided an image processing apparatus for adjusting an image that is formed by image data of a main scanning line, by either adding pixels to the image data or deleting pixels from the image data, the image processing apparatus comprising:

a first image forming unit configured to segment an image area of the main scanning line into a plurality of regions and form a first image having a first number of pixels in each of the plurality of regions;

a second image forming unit configured to form a second image having a second number of pixels that differs from the first number of pixels, in each of the plurality of regions;

an arithmetic unit configured to derive a scaling factor of an image in each of the plurality of regions, in accordance with a difference in size between the first image and the second image in each of the plurality of regions, and a differential between the first number of pixels and the second number of pixels;

a determination unit configured to determine the number of supplemental pixels to be either added to, or subtracted from, each of the plurality of regions, based on a total number of correction pixels that are either added to, or subtracted from, the image area of the main scanning line, and the scaling factor that is derived by the arithmetic unit; and an image correction unit configured to correct the image data that is formed in each of the plurality of regions, in accordance with the number of supplemental pixels determined by the determination unit.

According to an aspect of the present invention, there is provided a control method of an image processing apparatus for adjusting an image that is formed by image data of a main scanning line, by either adding pixels to the image data or deleting pixels from the image data, the control method comprising the steps of:

segmenting an image area of the main scanning line into a plurality of regions and forming a first image having a first number of pixels in each of the plurality of regions;

forming a second image having a second number of pixels that differs from the first number of pixels, in each of the plurality of regions;

deriving a scaling factor of an image in each of the plurality of regions, in accordance with a difference in size between the first image and the second image in each of the plurality of regions, and a differential between the first number of pixels and the second number of pixels;

determining the number of supplemental pixels to be either added to, or subtracted from, each of the plurality of regions, based on a total number of correction pixels that are either added to, or subtracted from, the image area of the main scanning line, and the scaling factor that is derived in the deriving step; and correcting the image data that is formed in each of the plurality of regions, in accordance with the number of supplemental pixels determined in the determining step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8A to FIG. 8C depict views explaining a process wherein a scale is altered by using a pixel modulator to add a supplemental pixel, according to the embodiment.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
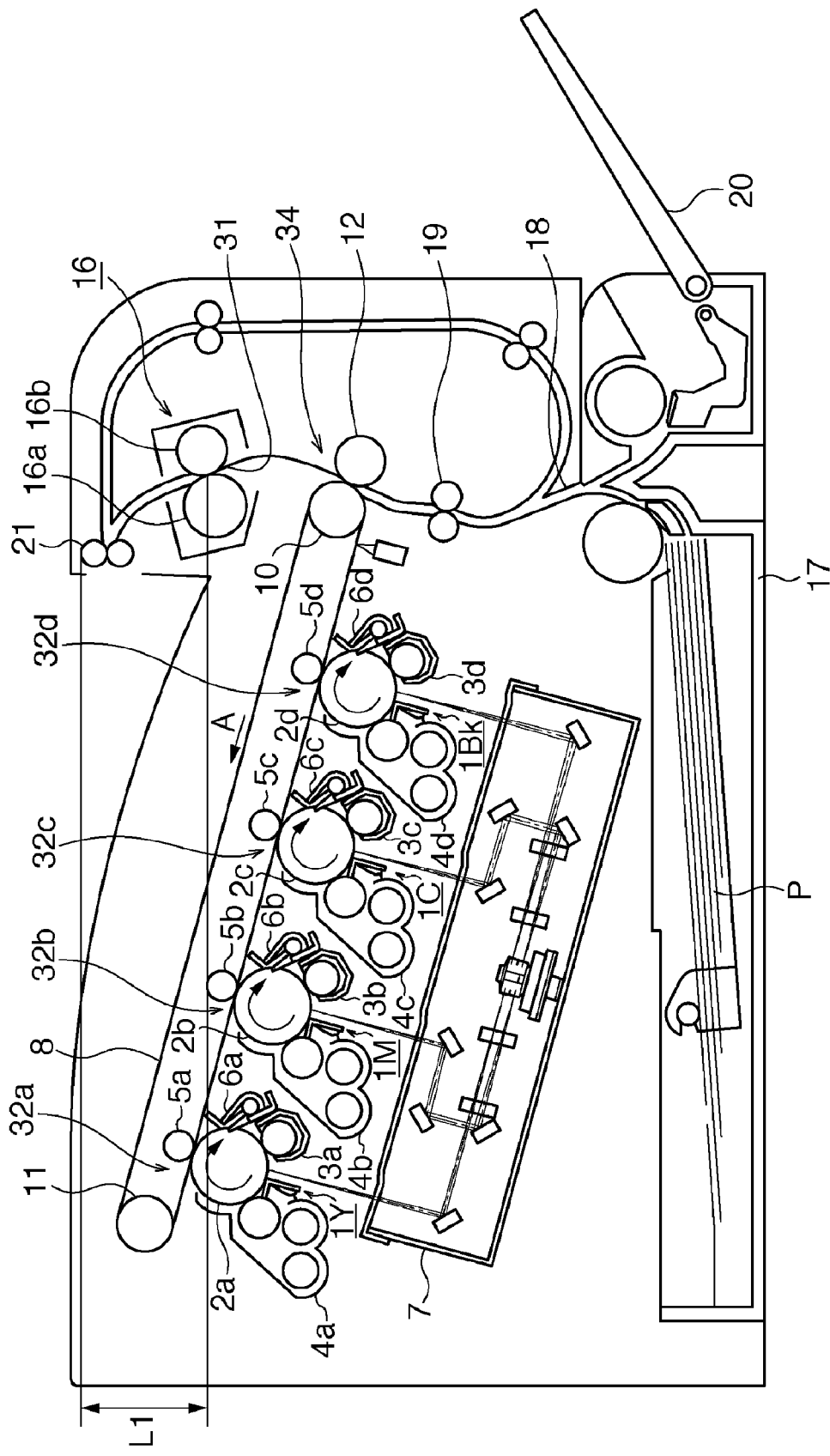
FIG. 1 is a conceptual configuration diagram illustrating an instance of a color image forming apparatus, that is, a color printer, according to an exemplary embodiment of the present invention.

FIG. 1 is a conceptual configuration diagram illustrating an instance of a color image forming apparatus, that is, a color printer, according to an exemplary embodiment of the present invention. The color printer, which uses an electrophotographic method to form an image, includes an intermediate transfer belt in a tandem type of the color printer. Whereas the description according to the embodiment refers to the color image forming apparatus (color printer), it is to be understood that it would be applicable as well to an image processing apparatus that executes the process according to the embodiment.

The color printer comprises four image forming units: an image forming unit 1Y, which forms a yellow (Y) image, an image forming unit 1M, which forms a magenta (M) image, an image forming unit 1C, which forms a cyan (C) image, and an image forming unit 1Bk, which forms a black (Bk) image. The four image forming units 1Y, 1M, 1C, and 1Bk are positioned in an array, spaced at a constant interval one from the other. The color printer further comprises paper feed unit, which are positioned beneath the four image forming units 1Y, 1M, 1C, and 1Bk, conveyance paths 18 and 19 of a sheet P, which is a recording medium, and which are positioned vertically with respect to the four image forming units 1Y, 1M, 1C, and 1Bk, and a fixing unit 16, which is positioned above the conveyance paths 18 and 19.

Following is a detailed description of each respective unit thereof.

An electrophotographic drum type photosensitive member (hereinafter "photosensitive drum") 2a, 2b, 2c, and 2d is installed within each of the four image forming units 1Y, 1M, 1C, and 1Bk, as an image carrier thereof. A primary charger 3a, 3b, 3c, and 3d, a developer 4a, 4b, 4c, and 4d, a transfer roller as a transfer device 5a, 5b, 5c, and 5d, and a cleaner unit 6a, 6b, 6c, and 6d, are each respectively positioned in a periphery around each of the photosensitive drums 2a, 2b, 2c, and 2d, respectively. A laser exposure unit 7 is installed beneath the primary chargers 3a, 3b, 3c, and 3d, and the developers 4a, 4b, 4c, and 4d, and in an interval therebetween. Each respective photosensitive drum 2a, 2b, 2c, and 2d is a negatively charged OPC photosensitive body and includes a photoconductive layer upon an aluminum drum body, and each respective photosensitive drum 2a, 2b, 2c, and 2d is driven in a rotational manner in a direction of an arrow, i.e., in a clockwise direction, and at a prescribed process speed, by a drive unit (not shown). Each of the primary chargers 3a, 3b, 3c, and 3d uniformly charges a surface of each respective photosensitive drum 2a, 2b, 2c, and 2d, by way of a charging bias that is impressed thereupon from a charging bias power supply (not shown), such that each respective photosensitive drum 2a, 2b, 2c, and 2d obtains a prescribed electrical potential with a negative polarity.

The laser exposure unit 7, which is positioned beneath the photosensitive drums, includes such as a laser emission unit, which performs a beam emission in response to an applied digital pixel signal of an image information, a polygonal lens, and a reflective mirror. Using the laser beam that is emitted from the laser emission unit to expose each respective photosensitive drum 2a, 2b, 2c, and 2d forms an electrostatic latent image upon the surface of each of the photosensitive drums 2a, 2b, 2c, and 2d that corresponds to an image of each respective color, in accordance with the pixel signal. A detailed description of a configuration of the laser exposure unit 7 will follow hereinafter.

The developers 4a, 4b, 4c, and 4d store a yellow toner, a cyan toner, a magenta toner, and a black toner, respectively, and develop, that is, make visible, the electrostatic latent image that is formed upon each respective corresponding photosensitive drum by causing the toner of each respective color to adhere thereto. The transfer rollers 5a, 5b, 5c, and 5d are positioned so as to be capable of making contact with each respective photosensitive drum 2a, 2b, 2c, and 2d, through an intermediate transfer belt 8, at each of primary transfer positions 32a, 32b, 32c and 32d. The toner image that is upon each respective photosensitive drum is transferred in a sequence to the intermediate transfer belt 8, and the toner images are superimposed upon one another on the intermediate transfer belt 8.

The cleaner units 6a, 6b, 6c, and 6d, which are respectively configured of such as a cleaner blade, clean the surface of each of the photosensitive drums by scraping off the toner that is left upon each respective photosensitive drum after the primary transfer has been performed thereupon. The intermediate transfer belt 8, which is suspended between a roller 10 and a tension roller 11, is positioned upon and above each respective photosensitive drum 2a, 2b, 2c, and 2d. The roller 10 is positioned with respect to a secondary transfer portion 34, so as to be capable of making contact with a secondary transfer roller 12. The intermediate transfer belt 8 is configured of a dielectric resin film, such as a polycarbonate, a polyethylene terephthalate resin film, or a polyvinylidene fluoride resin film. The image transferred from each respective photosensitive drum to the intermediate transfer belt 8, is secondarily transferred to the sheet P, which is conveyed from the paper feed unit, with respect to the secondary transfer portion 34. In addition, a belt cleaning device (not shown), which removes and collects the toner that is left upon the surface of the intermediate transfer belt 8, is installed in a location external to the intermediate transfer belt 8, and in an immediate vicinity of the tension roller 11. The formation of the image by way of each respective toner is performed by way of the process that is denoted by the foregoing description.

The paper feed unit includes a cartridge 17, which stores the sheets P, a manual feed tray 20, and a pick-up roller (not shown), which is for conveying the sheet P, one sheet at a time, from either the cartridge or the manual feed tray. The paper feed unit also includes a feed roller, and a feed guide 18, which convey the sheet P from the pick-up roller to a location of a registration roller 19. The registration roller 19 is a roller for conveying the sheet P to the secondary transfer portion 34, in synchronization with a timing of the forming of an image by the image forming units.

The fixing unit 16 includes therewithin a fixing film 16a, which comprises a heat source such as a ceramic heater plate, and a pressing roller 16b, which traps and presses the film against the ceramic heater plate. In addition, a guide 34, which is for guiding the sheet P to a nip portion 31 of the pair of rollers, is installed in front of the fixing unit 16, and a discharge roller 21, which is for guiding the sheet P that is outputted from the fixing unit 16 to the outside of the apparatus, is installed to the rear of the fixing unit 16. A controller (150 in FIG. 2) includes such as a control substrate and a motor driver substrate (not shown), which are for controlling a driving of a working of each respective unit that is denoted in foregoing description.

Figure 2:
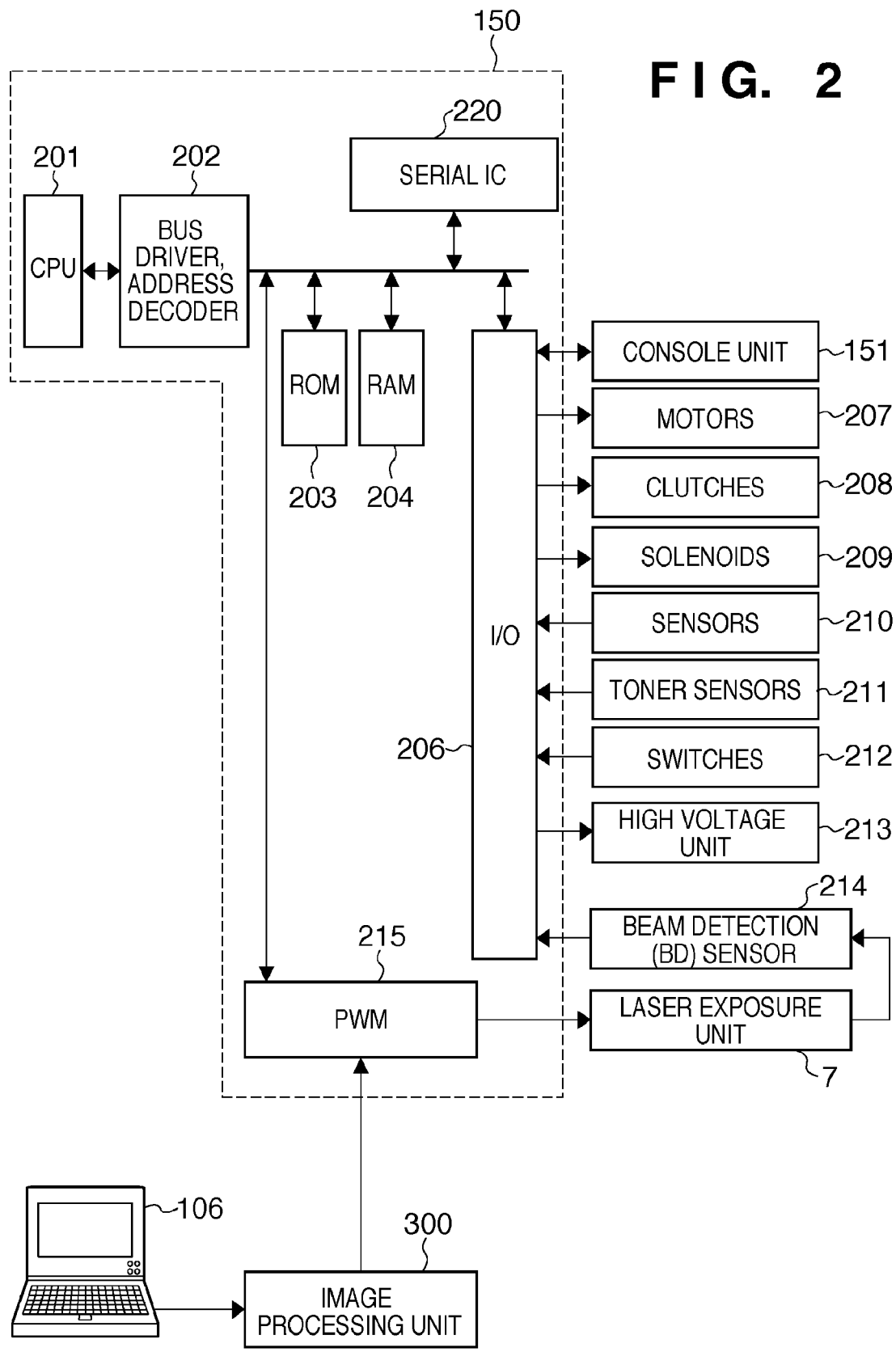
FIG. 2 is a block diagram describing a configuration of the image forming apparatus according to the embodiment.

FIG. 2 is a block diagram describing a configuration of the image forming apparatus according to the embodiment.

A CPU 201 of the controller 150 controls an overall operation of the color printer, according to a program that is stored in a ROM 203. An address bus and a data bus of the CPU 201 are connected to a respective load, by way of a bus driver, and an address decoder circuit 202. A RAM 204 is a primary storage device, which is employed in such a manner as for storing a data that is inputted into the controller 150, or as a storage region for use during an operation. An I/O interface 206 controls an interface between respective units (to be described hereinafter) and CPU 201. In addition, the controller 150 contains a pulse width modulation (PWM) circuit 215, which generates a pulse width signal corresponding to the image data. Reference numeral 220 denotes a serial interface, which connects the controller 150 to an external device, by way of such as USB.

A console unit 151 includes keys that are manipulated by an operator, as well as a display unit, which may be such as an LCD or an LED display, and which displays such information as the status of the apparatus. Motors 207, clutches 208, and solenoids 209 are installed in order to perform driving of the feed, the conveyance, and the optical assemblies. Sensors 210 detect the recording medium, that is, the recording sheet, that is being conveyed. Each of toner sensors 211 is positioned within each of the developers and detects a quantity of the toner within each of the developers, and outputs an output signal thereof to the I/O interface 206. Signals are also inputted from switches 212, which detect such as a home position of each respective load or an open or close status of a door, into the I/O interface 206. Reference numeral 213 denotes a high voltage unit, which supplies a high voltage current to the primary chargers, the developers, a pre-transfer charger, a transfer charger, and a separation charger, according to a command from the CPU 201.

An image processing unit 300 receives an image signal as an input that is outputted from such as a PC 106 that is connected thereto, performs an image process upon the image signal that is inputted thereto, and outputs a control signal of the laser exposure unit 7, in accordance with print data generated from the image signal. The laser beams that are outputted from the laser exposure unit 7 are projected upon the respective photosensitive drums and cause the exposure of the image thereupon, respectively. At the same time, a beam detection (BD) sensor 214, that is, a beam sensor detects the status of the beam emission in a region other than the image region, and outputs an output signal thereof to the I/O interface 206.

Following is a description of a configuration of the laser exposure unit 7 according to the embodiment, with reference to FIG. 3 through FIG. 6.

Figure 3:
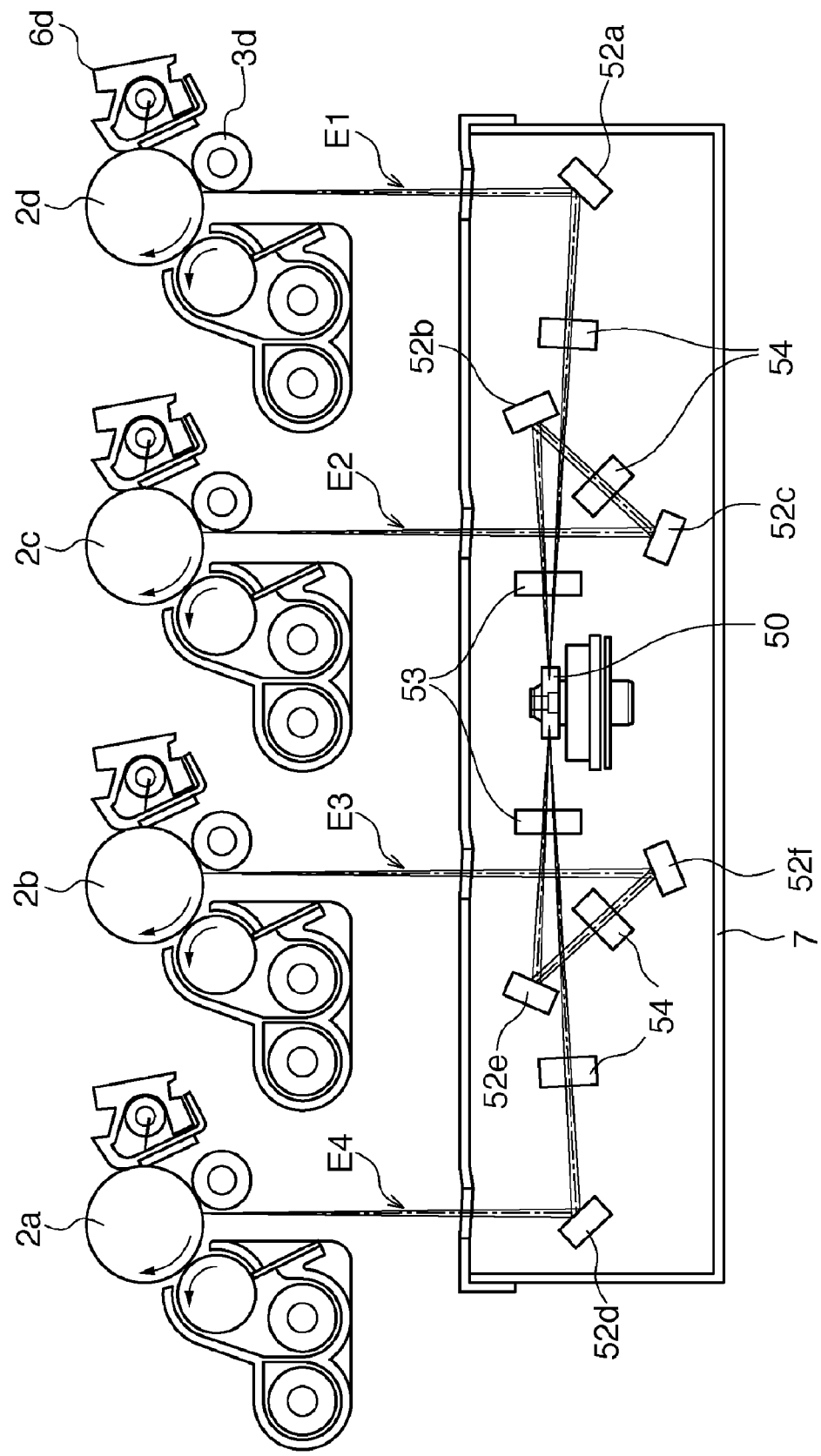
FIG. 3 depicts a conceptual view illustrating an image forming unit that includes such as a laser exposure unit and a photosensitive drum, according to the embodiment.

FIG. 3 depicts a conceptual view illustrating an image forming unit that includes such as a laser exposure unit and a photosensitive drum, according to the embodiment. Elements in FIG. 3 that are identical to elements in FIG. 1 will be denoted herein with identical reference numerals.

The laser exposure unit 7, which is positioned beneath the photosensitive drums 2a to 2d, projects two laser beams, respectively, at each side of a polygonal mirror 50, using each respective laser beam E1 to E4 to cause each respective photosensitive drum to be exposed. Reference numeral 53 denotes an f-θ lens, which causes the laser beam to be spot imaged upon the drum. Reference numerals 52a to 52f denote reversion mirrors, which reflect the laser beam in a prescribed direction. Reference numeral 54 denotes an imaging lens.

The polygonal mirror 50 is centrally positioned with respect to the laser exposure unit 7. Given that an optical path to each respective photosensitive drum possesses a left-right symmetry, each respective group of the laser beam E1 and E2 will be described. The laser exposure unit 7 is a grazing-incidence optical system unit, which uses a flat polygonal mirror in order to achieve a miniaturization of a scanning optical unit thereof.

Figure 4A:
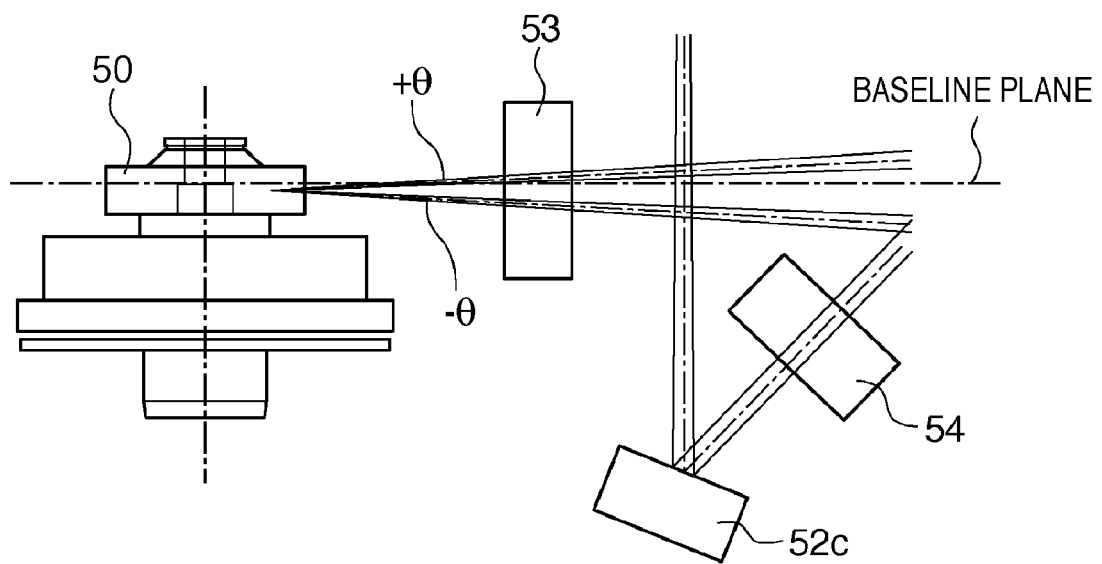
FIG. 4A and FIG. 4B depicts a view explaining a relationship between a polygonal mirror and each respective type of lens.
Figure 4B:
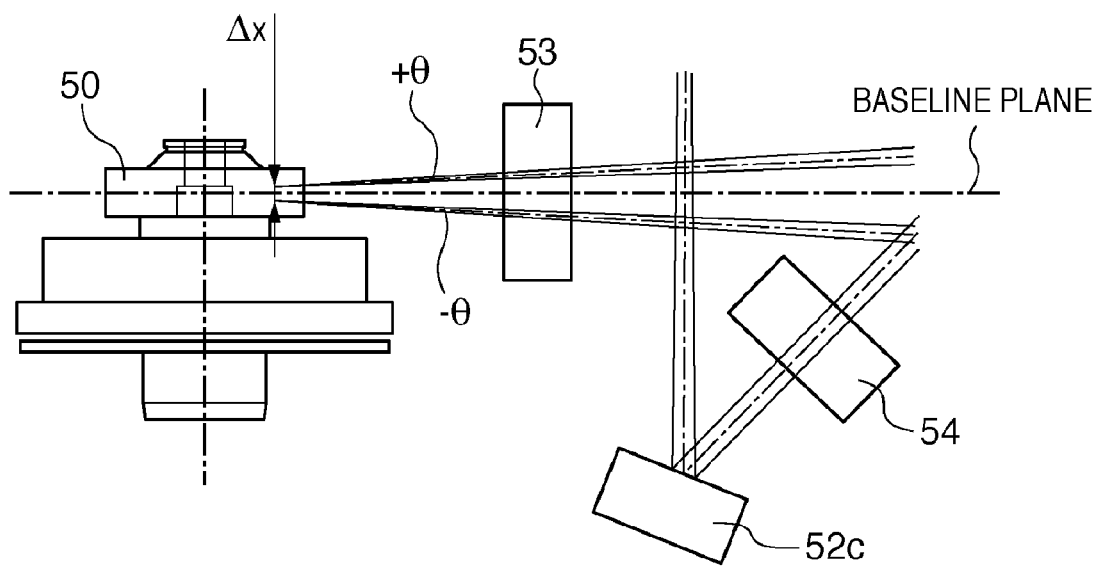

FIG. 4A and FIG. 4B depicts a view explaining a relationship between a polygonal mirror and each respective type of lens.

Figure 5:
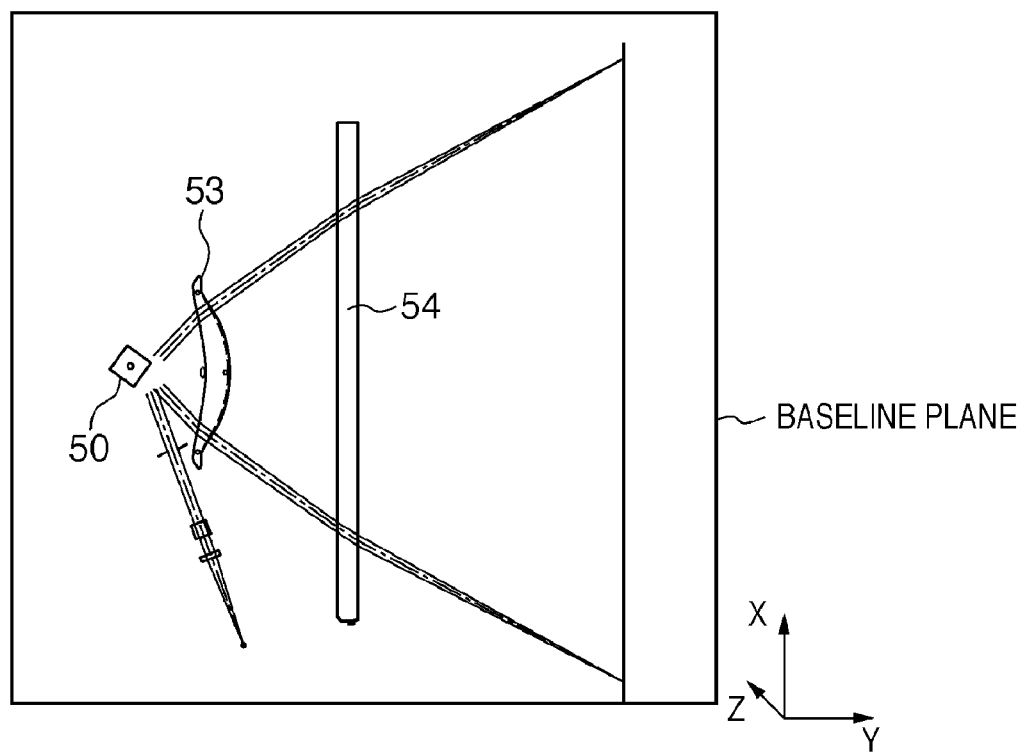
FIG. 5 depicts a baseline plane view illustrating the laser exposure unit according to the embodiment.

In FIG. 4A, a laser beam in the grazing-incidence optical system is incident to the polygonal mirror 50 at an angle that is opposite to both a normal of the face of the polygonal mirror 50 and a plane that is defined by a direction of a rotation of the polygonal, that is, a baseline plane, designated as an X-Y plane in FIG. 5. Thereby, after reflected from the polygonal mirror 50, the laser beam separates into an upper and a lower optical path. FIG. 4A depicts a circumstance wherein the reflection points of the laser beams with respect to the polygonal mirror 50 are the same, while FIG. 4B depicts a circumstance wherein the reflection points of the laser beam with respect to the polygonal mirror 50 are different.

FIG. 5 depicts a baseline plane view illustrating the laser exposure unit according to the embodiment.

In a typical circumstance, it is considered preferable for the baseline plane and a deflecting scanning laser to form a relative angle of 3 degrees or less. According to the embodiment, a grazing incidence angle is mutually equal and opposite. In the present circumstance, it would be permissible for the reflection points with respect to the polygonal mirror 50 either to be identical, such as is depicted in FIG. 4A, or to deviate in the direction of the height of the mirror surface, such as is depicted in FIG. 4B. As an instance in the present circumstance, it would be possible to position the reversion mirror 52b for optical path separation more closer to the mirror 50 by causing the reflection points with respect to the polygonal mirror 50 to deviate such as is depicted in FIG. 4B.

In FIG. 3, the two laser beams that are deflected by the polygonal mirror 50 penetrate the f-θ lenses 53. In the present circumstance, the laser beams that pass through an upper side of the laser exposure unit 7 are reflected to the lower direction thereof with the reversion mirror 52b for optical path separation. In the present circumstance, the f-θ lenses 53 are configured as cylindrical lenses, owing to the fact that the laser beams are both incident thereto at different angles, and form the images with the imaging lenses 54, which are positioned upon each respective optical path in a sub-scanning direction thereof. Thus separated the laser beams travel in a lower direction, intersecting with the other laser beams, and penetrate the imaging lens 54 that are installed along the optical paths thereof. Thereafter, the laser beam is re-reflected by the reversion mirror 52c for optical path separation, which is positioned in a lower side of the laser exposure unit 7, whereupon the re-reflected laser beam passes the imaging lenses 54, and is thereby projected upon the photosensitive drum 2c.

In addition, the laser beam that is projected upon the photosensitive drum 2d which is at an end, passes directly below the reversion mirror 52b for optical path separation, penetrates the imaging lens 54, and is projected upon the photosensitive drum 2d by the reversion mirror 52a. In the present circumstance, the reversion mirror 52b for optical path separation is positioned in a location such that the two laser beams will not cause a light beam of the vignetting by such as a tolerance of each respective component, or a plain tilt of a polygonal mirror motor.

When a length of the optical path of the optical assembly is longer than the length thereof according to the embodiment, it is to be understood that it would be permissible to position two reversion mirrors, that is, a first and a second mirrors, in a manner similar to the circumstance wherein the exposure is performed upon the photosensitive drums 2a and 2d, which are in the center of the photosensitive drum assembly, as well as upon the optical path that projects the laser beams upon the photosensitive drums 2a and 2d, which are at either end of the photosensitive drum assembly. A configuration would also be permissible wherein the laser beam E1 intersects its own laser beam that has been deflecting scanned with the polygonal mirror 50. In such a circumstance, it would also be permissible to position the imaging lens 54 upon the optical path from the first mirror to the second mirror, as per the circumstance with the laser beam E2, rather than upon the optical path from the polygonal mirror 50 to the first mirror.

In addition, it would also be permissible for the location of the imaging lens 54 to be positioned to the rear of the reversion mirror 52c. Taking into consideration an adjustment of the location of the projection of the laser beam upon the photosensitive drum by the reversion mirror 52c, however, a possibility arises of the position of the laser beam that is incident to the imaging lens 54 changing, and the optical performance thereof being altered as a consequence thereof. Thus, according to the embodiment, the imaging lens 54 is positioned between the reversion mirror 52b for the optical path separation and the reversion mirror 52c, and a more compact configuration is achieved, without the optical alteration occurring, by positioning the imaging lens 54 in a gap in the optical path.

In addition, causing the laser beam to reflect below the photosensitive drum, that is to say, to reflect the laser beam in a direction that causes the laser beam to travel away from the photosensitive drum, and also causing the laser beam thus traveling to intersect all of the laser beams that have been reflected from the polygonal mirror with the second reversion mirror 52c, also makes the optical assembly more compact.

On the other hand, positioning the second imaging lens 54 between the reflective mirrors allows shortening a distance in a lengthwise direction of the mirrors, as well as using a space effectively with respect to the positioning of the lens, and reducing the thickness of the laser exposure unit 7.

It is to be understood that it is apparent that the configuration according to the embodiment does not change, even if a single laser diode chip emits a plurality of laser beams, and thus, a similar effect can be obtained thereby.

It is also to be understood that, whereas the foregoing description describes the circumstance of the laser beam E1 and E2, the description applies in a similar manner to the circumstance of the laser beam E3 and E4, by using the symmetry thereof, and a description of the circumstance thereof will be omitted accordingly.

Figure 6:
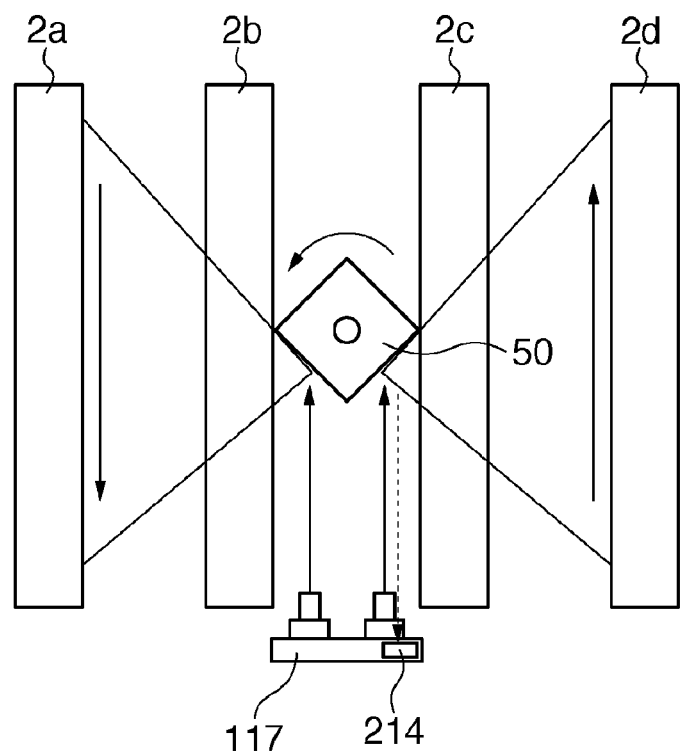
FIG. 6 depicts a top view illustrating a scan of a laser beam that the laser exposure unit projects upon the photosensitive drum, according to the embodiment.

FIG. 6 depicts a top view illustrating the scan of the laser beam that the laser exposure unit 7 projects upon the photosensitive drum, according to the embodiment.

In FIG. 6, the beam detection (BD) sensor 214 is mounted upon a laser driver substrate 117, and is fitted to a side thereof such that the laser beam scan commences with the black (Bk) photosensitive drum 2d. The laser exposure scan upon the photosensitive drums other than the photosensitive drum 2d is also performed based upon the beam detection signal that is derived from the beam detection (BD) sensor 214. When the laser beams are projected on the polygonal mirror 50 in the same direction, such as is depicted in FIG. 6, the laser exposure scans upon the yellow (Y) and magenta (M) photosensitive drums 2a and 2b are performed from an opposite edge of the main scanning direction, facing from the bottom to the top of FIG. 6, in a direction opposite to the exposure upon the cyan (C) and black (Bk) photosensitive drums 2c and 2d. In such a circumstance, a single line of the yellow (Y) and magenta (M) video data is entered into such as a Last In First Out (LIFO) memory, and an order of image data is changed.

Figure 7:
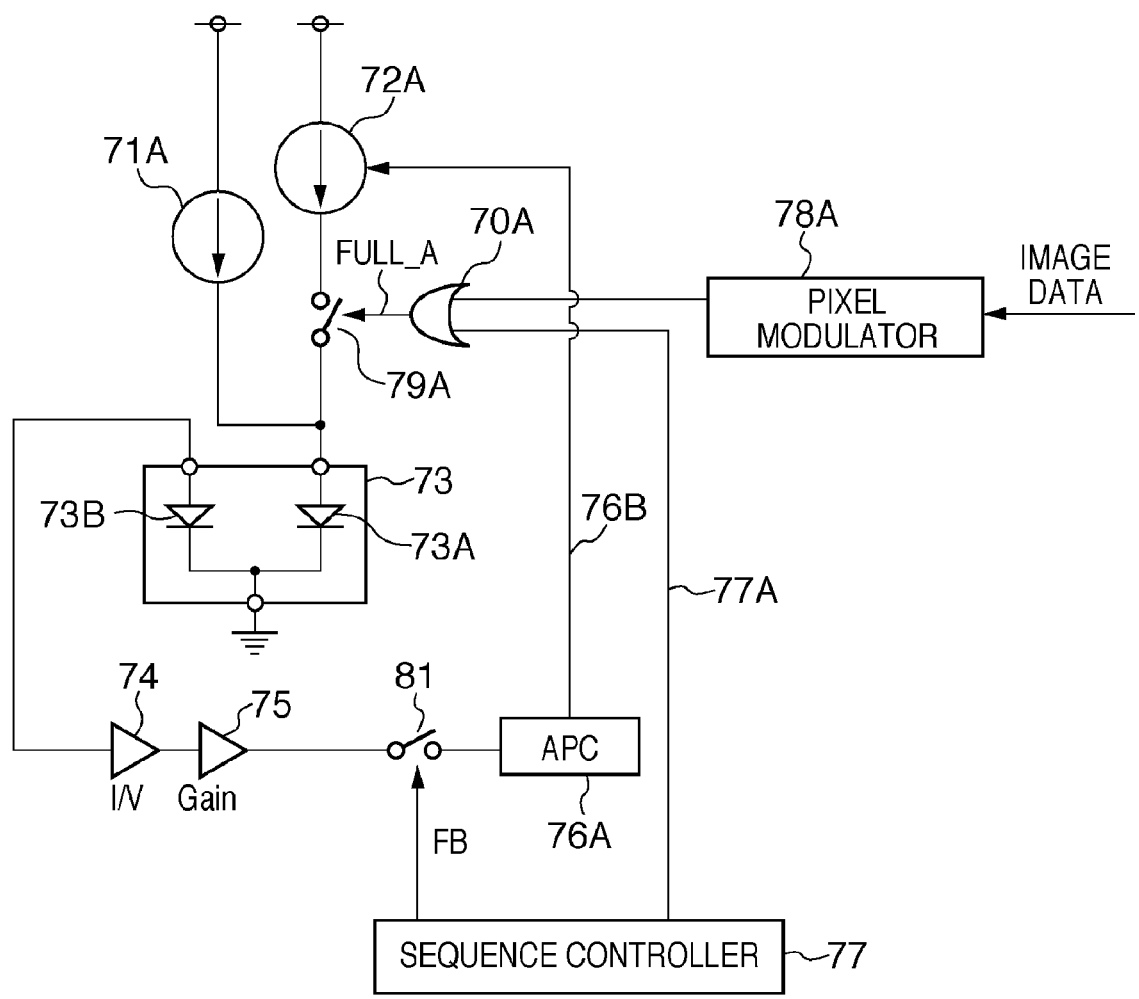
FIG. 7 is a block diagram that explaining a laser driving circuit of the laser exposure unit, according to the embodiment.

FIG. 7 is a block diagram that explaining a laser driving circuit of the laser exposure unit 7, according to the embodiment.

Reference numeral 73 denotes a laser chip, which outputs a single laser beam. The laser chip 73 includes a laser diode 73A, and a photodiode 73B, the latter whereof functions as a sensor of a quantity of light. Causing a bias electrical current source 71A and a pulse current source 72A to supply an electrical current to the laser diode 73A facilitates, in turn, an improvement in a light emission characteristic of the laser diode 73A. In addition, an output signal from the photodiode 73B is returned to the pulse current source 72A, and an automatic control of a quantity of the pulse current is performed when the laser is switched on, in order to stabilize the light emission of the laser diode 73A. Put another way, the quantity of light emitted by the laser is adjusted, such as per the following description, in an intermittent interval between the projection of the laser beam upon the photosensitive drums.

When controlling the pulse current of the laser diode 73A, a sequence controller 77 forms a feedback loop by activating a feedback line and switching on a switch 81. The sequence controller 77 thereafter sets a signal 77A to a high level, and a switch on signal is supplied from a logic (OR) element 70A to a switch 79A, in order to activate a FULL_A line. In such a state, a sum of the electric currents that are discharged from the bias electrical current source 71A and the pulse current source 72A flows to the laser diode 73A. The signal that is outputted from the photodiode 73B is supplied to a current voltage transformer 74, and a voltage signal obtained therefrom that corresponds to a brightness of light emission of the laser diode 73A. The voltage signal thus obtained is amplified with an amplifier 75, and is outputted thereafter, via the switch 81, to an auto power control (APC) circuit 76A. The auto power control circuit 76A supplies a control signal 76B to the pulse current source 72A in accordance with the brightness of light emission, and sets the pulse current such that the laser diode 73A emits at a target quantity of light. The auto power control (APC) circuit is commonly used as a laser drive circuit.

The laser diode 73A possesses a temperature characteristic, such that the higher the temperature, the more the quantity of electric current is increased in order to obtain a constant quantity of light. In addition, the laser diode 73A spontaneously discharges heat, thereby making it impossible to obtain the constant quantity of light only by supplying a constant electric current, and a significant impact upon the image formation is incurred thereby. As a solution to such a problem, the auto power control (APC) circuit 76A is employed on a per scan basis to control the quantity of electric current such that the light emission characteristic of each respective scan is constant. The laser beam that is thus controlled to have the constant quantity of light forms an image by switching the switch 79A on and off with a data that is modulated by an a pixel modulator 78A. It is to be understood that, when forming the image, the sequence controller 77 sets the signal 77A to a low level, and causes the output of the pixel modulator 78A to be outputted to the FULL_A line.

FIG. 8A to FIG. 8C depict views explaining a process wherein a scale is altered by using the pixel modulator 78A to add a supplemental pixel (bit in FIGS. 8A to 8C), according to the embodiment.

In the present circumstance, it is presumed that a pixel is configured of a data array of x bits. Put another way, a pixel comprises x bits of multiple value data. The image data that is depicted in FIG. 8A to FIG. 8C is presumed to exist upon the same single line. Each single line includes n pixels, and each line is extended to (n+1) pixels by adding a bit (supplemental pixel) while shifting one bit on a per pixel basis.

In FIG. 8A, when correcting the data between the (i−1)th pixel and the i-th pixel, the last bit, that is, x-th bit of the (i−1)th pixel is appended to a first bit of the i-th pixel, such as is depicted by a reference numeral 800 therein. The last bit, that is, the x-th bit of the (i−1)th pixel is thus appended to the first bit of the i-th pixel. The last bit of the i-th pixel is thus moved to a first bit of a (i+1)th pixel. In similar manner, at least one bit is added to an arbitrary bit location of the (i−1)th pixel, and a number of bits that is equivalent to the number of bits thus added are shifted out from the (i−1)th pixel to the succeeding i-th pixel.

In FIG. 8B, when performing a correction of data between (m−1)th pixel and m-th pixel, the last bit 801 of (m−2)th pixel is appended to a first bit of the (m−1)th pixel. In addition, the last bit 802 of the (m−1)th pixel is a (x−1)th bit of the (m−1)th pixel, and is thus appended to a first bit of the m-th pixel. The last bit of the (m−1)th pixel, that is, the x-th bit, is thus appended to the first bit of the m-th pixel. As a consequence, appending the bit 802, that is, the (x−1)th bit of the (m−1)th pixel, to the first bit of the m-th pixel further causes the m-th pixel to be shifted by two bits. As a consequence thereof, the x-th bit and the (x−1)th bit 803 of the m-th pixel are shifted to a first bit and a next bit after the first bit of the (m+1)th pixel.

In FIG. 8C, when performing a correction of the data between the (n−1)th pixel and the n-th pixel, bits from the first bit to the (x−2) th bit of the preceding pixel, that is the(n−2)th pixel, are appended from the first bit to the (x−2)th bit of the (n−1)th pixel. The last bit of the (n−1)th pixel would normally be a first bit of the (n−1)th pixel, and is appended to a first bit of the n-th pixel. Given that the last bit of the (n−1)th pixel is appended to the first bit of the n-th pixel, the data that comprises the content of the n-th pixel is the same as the data that comprises the content of the original (n−1)th pixel.

Thus, shifting the last bit of the pixel (n-th pixel) in sequence to the first bit of the succeeding pixel, that is, the (n+1)th pixel, will cause the (n+1)th pixel to be identical with the n-th pixel, when x=n. Given the present single line with the number of pixels n, the preceding process facilitates transforming the number of pixels of the present single line from n to (n+1).

Whereas the preceding description describes a circumstance wherein the number of pixels of a single line is increased by only one pixel over a preset number of pixels, it would be possible to perform a similar control in a circumstance wherein the scale of the image is altered by adding a greater number of pixels to the line. In such a circumstance, the number of bits that are shifted from the preceding pixel to the following pixel would be increased, with respect to the preceding description. It would thus be possible to add, that is, insert, a greater number of pixels.

Conversely, it would also be possible to reduce the number of pixels in the single line, that is, to shorten the line, by performing a reverse operation to the operation that is depicted in FIG. 8A to FIG. 8C. Put another way, presuming a condition identical to the foregoing, when correcting the data between the (i−1)th pixel and the i-th pixel, the first bit of the i-th pixel is moved to the x-th bit of the (i−1)th pixel. The first bit of the i-th pixel is thereby appended to the last bit of the (i−1)th pixel. In a similar manner, when correcting data between the i-th pixel and the (i+1) th pixel, the first bit of the (i+1)th pixel is moved to the x-th bit of the i-th pixel. In a similar manner, shifting the bits in a leftward direction thereafter in the reverse of the process depicted in FIG. 8A to FIG. 8C, given the present single line with the number of pixels n, facilitates transforming the number of pixels of the present single line from n to (n−1)

Following is a description relating to a method of creating a scaling factor correction table, for use in determining the number of bits to either insert, or delete, with respect to each respective location in the main scanning direction, with reference to FIG. 9A to FIG. 11.

Figures 9A, 9B:
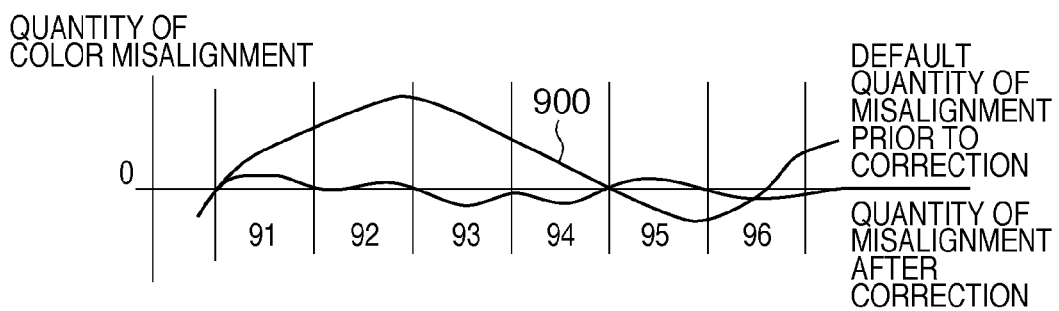
FIG. 9A depicts a view explaining a relationship between an optical characteristic and the photosensitive drum, in a main scanning direction.
FIG. 9B depicts a view illustrating a quantity of scaling that is measured on a per respective region basis in FIG. 9A.

FIG. 9A depicts a view explaining a relationship between an optical characteristic and the photosensitive drum, in the main scanning direction, and the image that is formed upon the drum. Whereas a circumstance is envisioned in FIG. 9A wherein the main scanning direction is segmented into six regions 91 to 96, the number of divisions is determined in accordance with such factors as the length of the main scanning direction and the optical characteristic. In FIG. 9A, the line of the main scanning direction, which should normally be horizontally flat, denotes a state of deviation such as is depicted by reference numeral 900, owing to such factors as a misalignment of the laser beam path or an installation tolerance of such as the laser exposure unit. The deviation thereof causes the length of the main scanning direction of the pixels that are formed in each respective region to vary, even if an identical number of pixels are formed therein. An objective of the embodiment is to correct a misalignment of a pattern of each respective color that arises from the difference in the length of the main scanning direction.

Figure 10:
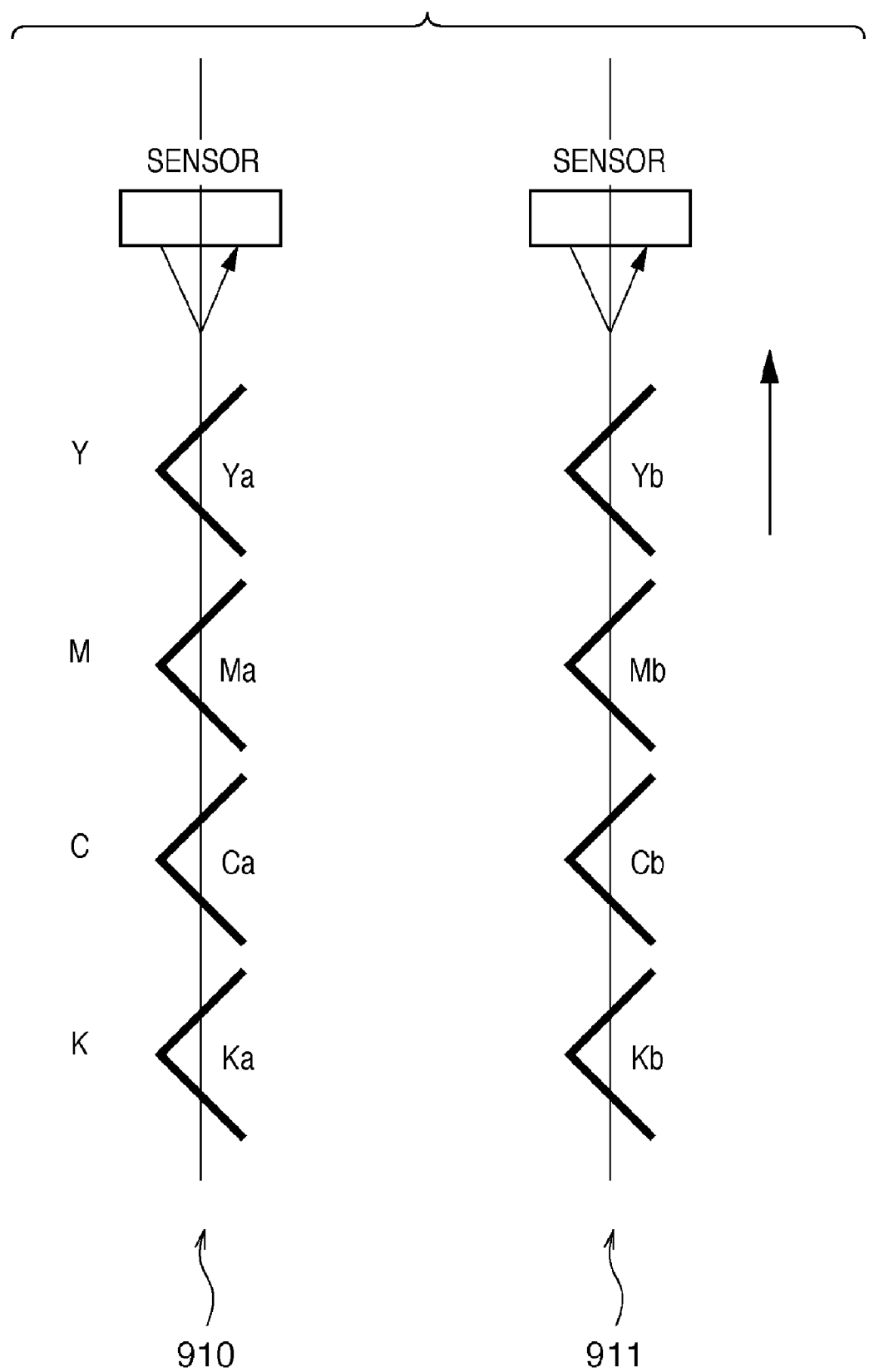
FIG. 10 depicts a view illustrating an instance of forming a test pattern in order to create a scaling factor correction table, according to the embodiment.

FIG. 10 depicts a view illustrating an instance of forming a test pattern in order to create a scaling factor correction table, according to the embodiment.

In FIG. 10, a horizontal direction denotes the main scanning direction, and patterns 910 and 911 are formed by leaving a prescribed interval in the main scanning direction. A vertical direction denotes a sub scanning direction, that is, a direction wherein the sheet is fed. Reference numeral 910 denotes an instance of forming a test pattern from a first image data of a first number of pixels, wherein no supplemental pixel has been inserted, that is, a first image. Reference numeral 911 denotes an instance of forming a test pattern from a second image data of a second number of pixels, wherein the supplemental pixels have been inserted, that is, a second image. It is to be understood that the patterns are not restricted to the instance thus depicted, and that it would be permissible to employ any sort of patterns that would be capable of detecting a difference in the number of pixels of the main scanning direction, that is, a deviation of location or a difference in size.

If a pattern of an angle bracket shape is generated for each respective color, such as is depicted in FIG. 10, it will be possible to detect a scaling factor by detecting the interval between the patterns Ma and Mb, for magenta (M), as depicted therein. In the present circumstance, pixels are added on a per region basis for each respective region that is depicted in FIG. 9A, and a proportion of length of the pattern that is actually formed is derived for the number of pixels that are added thereto.

FIG. 9B depicts a view illustrating a quantity of scaling that is measured on a per respective region basis in FIG. 9A.

In the present circumstance, wherein 32 pixels are added on the per respective region basis, FIG. 9B depicts the length of the patterns that are actually extended and formed by the addition of the pixels, as well as the scaling factor thereof. According to FIG. 9B, the lengths of images that are formed in regions 91, 92, and 96 are respectively longer than the length of the pixels that were added thereto, whereas the lengths of images that are formed in regions 93, 94, and 95 are respectively shorter than the length of the pixels that are added thereto. In summary, the optical characteristic of the main scanning direction is in error in accordance with the location of the main scanning direction, and as a consequence, the scaling factor thereof differs in accordance with the location of the pixels that are added thereto. As a consequence, the scaling factor differs overall, depending on the location (region) wherein the pixels are added, even if the number of the pixels that are added thereto is the same.

Figure 11:
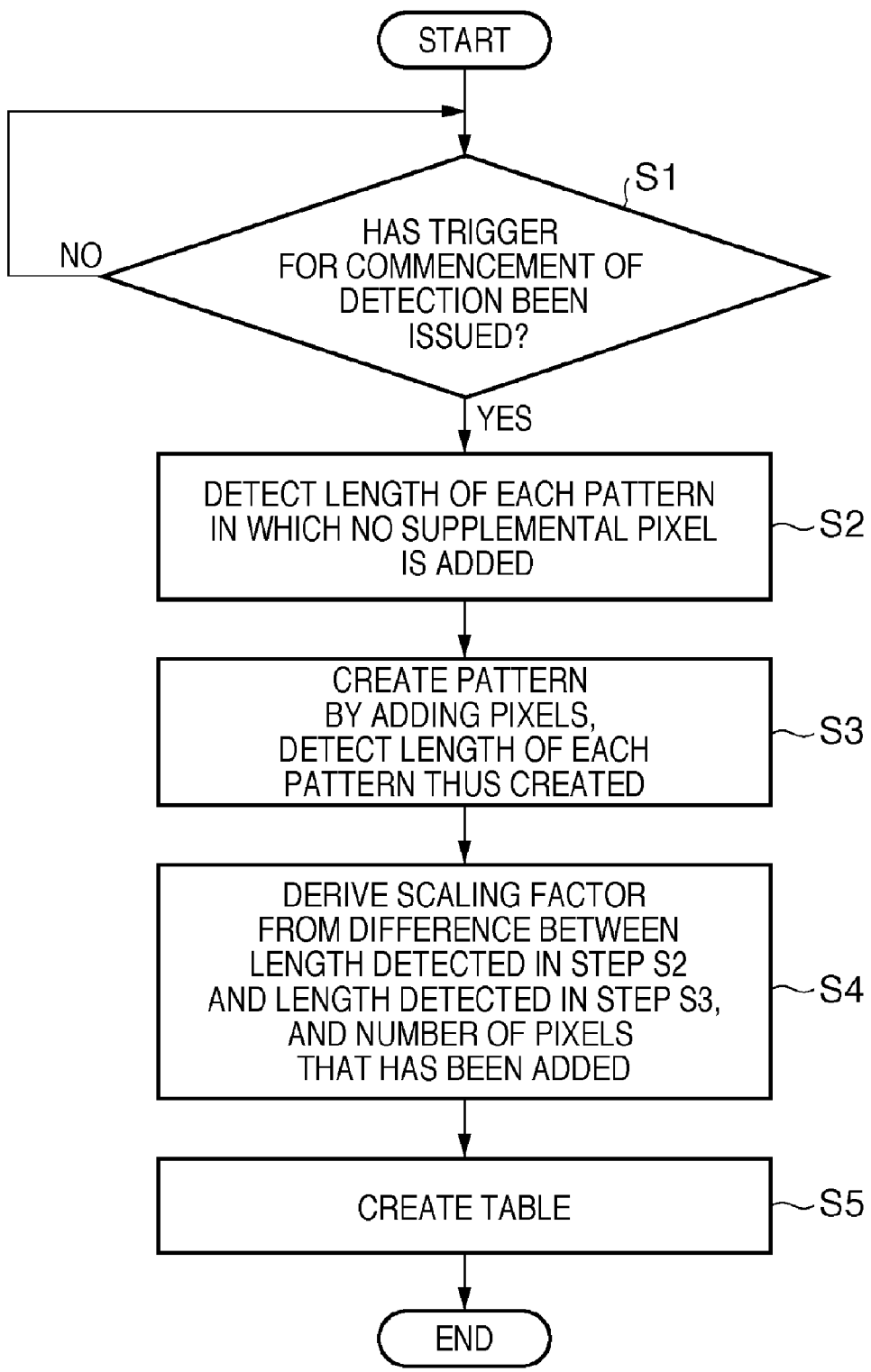
FIG. 11 is a flowchart explaining a process that is performed when creating the scaling factor correction table.

FIG. 11 is a flowchart explaining a process that is performed when creating the scaling factor correction table.

First, in step S1, it is determined whether or not a trigger has been inputted that will commence the sequence depicted herein. An instance of the trigger would correspond to instructing, that the sequence commences under such a circumstance as when the apparatus ships from the factory or when the electric power is switched on thereto, every time a given interval passes, every time the number of sheets whereupon an image is recorded reaches a given number, or according to an operation by the user. If the trigger is inputted when the detection commences, the process proceeds to step S2, wherein the pattern is formed in the state wherein the supplemental pixel has not been added, that is, the first image formation, and the interval, that is, the length, of the pattern thus formed is derived. As an instance thereof in the present circumstance, each respective pattern Ya, Ma, Ca, and Ka is formed, such as is denoted in FIG. 10, based on image data wherein the supplemental pixel is not added, and the length of each pattern in the main scanning direction is detected, as each respective default value. Thereafter, the process proceeds to step S3, wherein a given number of pixels are added on a regional basis to each respective segmented region, such as is depicted in FIG. 9A, the patterns are formed in accordance therewith, that is, the second image formation, and the length of the each pattern thus formed is detected. Thereafter, the process proceeds to step S4, wherein the scaling factor of each pattern that is formed is derived in accordance with the difference between the length detected in step S3 and the length detected in step S2, and the number of supplemental pixels that has been added.

Specifically, 32 supplemental pixels are added to the region 91, the patterns Yb, Mb, Cb, and Kb are formed once more, as depicted in FIG. 10, and the scaling quantity thereof is derived. In the present circumstance, the patterns that are formed thereby may not necessarily be lengthened by the number of supplemental pixels, despite the fact that the 32 pixels have been added thereto, owing to the effect of the optical characteristic thereupon. In response thereto, a derivation is made as to the extent to which the pattern Mb, wherein the 32 supplemental pixels have been added, has lengthened for the length of the pattern Ma, wherein the supplemental pixels have not been added, as was derived in step S2. The detection operation is performed for each respective region 91 to 96 that is depicted in FIG. 9A, and is also executed for all colors.

FIG. 9B depicts an instance of a result of the detection thereof, for a single color.

FIG. 9B denotes that the scaling factor of the pattern formed therein varies in response to the optical characteristic of the laser beam that is projected upon each respective region. When the detection operation is completed for all of the patterns, the process proceeds to step S5, wherein the scaling factor correction table is created in accordance with the scaling factor that is derived in step S4.

The table contains a value that denotes the scaling factor for each respective region, such as is depicted in FIG. 9B. Put another way, the table denotes the scaling quantity for each respective region. When the scaling factor correction table is created, the sequence of creating the correction table terminates.

Figure 12:
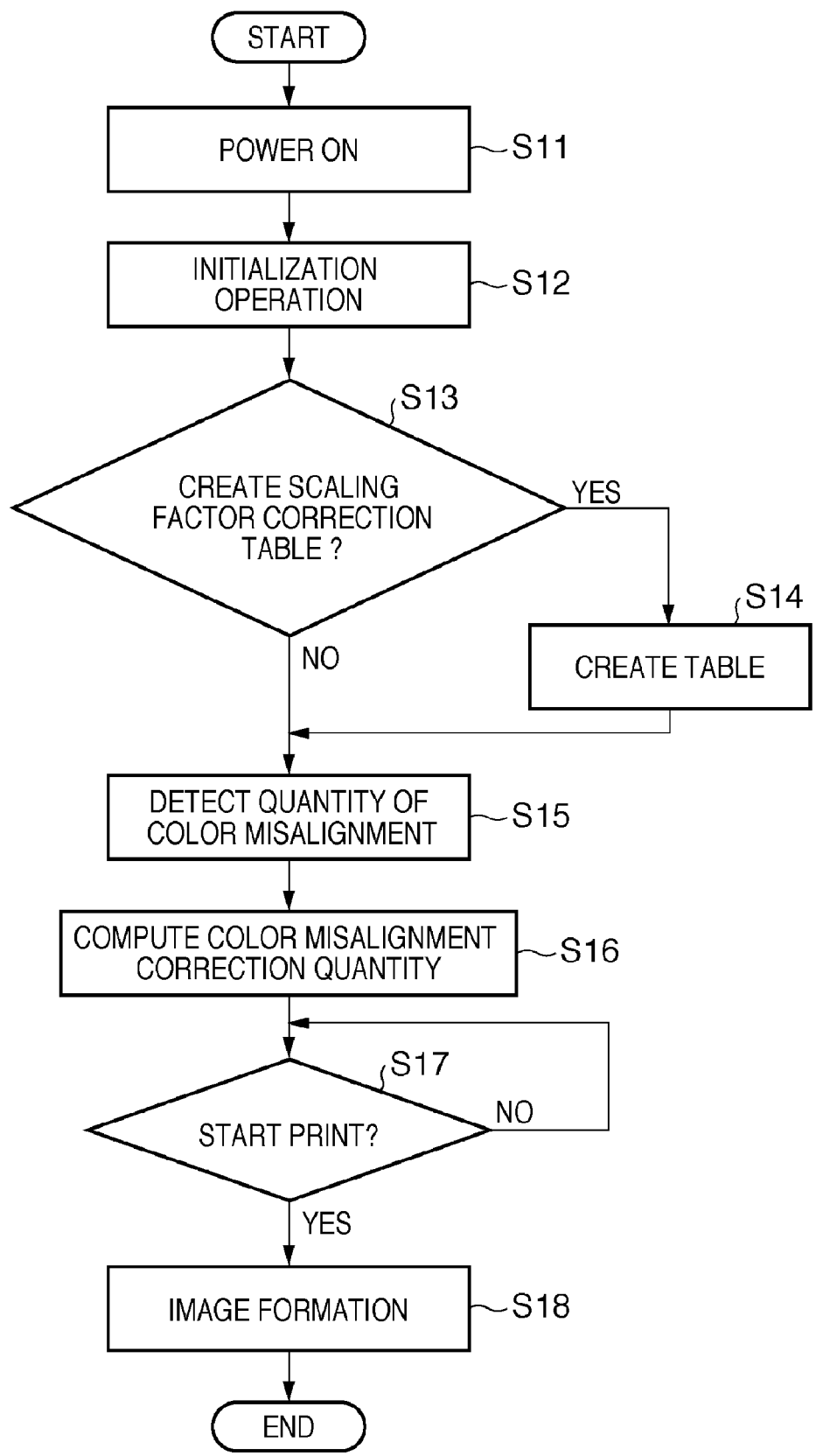
FIG. 12 is a flowchart explaining a process of correcting a color misalignment of the color image forming apparatus, as well as a printing process thereof, according to the embodiment.

Following is a description of a process flow up to the correction of the misalignment of color and the formation of the image, with reference to the flowchart that is depicted in FIG. 12.

FIG. 12 is a flowchart explaining the process of correcting the color misalignment of the color image forming apparatus, as well as a printing process thereof, according to the embodiment.

When the electric power supply is switched on in step S11, the process proceeds to step S12, wherein an initialization operation for the image formation is executed. Thereafter, the process proceeds to step S13, wherein it is determined whether or not an instruction to create the scaling factor correction table has been given, and if the instruction thereof has been given, the process proceeds to step S14, wherein the scaling factor correction table is created in a manner similar to the flowchart that is depicted in FIG. 11. The determination as to whether or not to perform the creation of the scaling factor correction table at the present timing is made based on such as the performance of the machine. No necessity exists for the creation of the scaling factor correction table to necessarily be performed at the present timing; it would be permissible instead to allow the creation thereof to be performed either when the apparatus is shipped from the factory, or in response to an operation by the user.

If, on the other hand, the scaling factor correction table has already been created in step S13, the process proceeds instead to step S15, wherein the sequence of detecting the quantity of color misalignment is performed. In the circumstance of the color image forming apparatus according to the embodiment the operation of detecting the quantity of color misalignment is performed for each respective color, that is, yellow (Y), magenta (M), cyan (C), and black (Bk). The quantity of color misalignment (misalignment of output of image data) is detected in the sub scanning direction and the main scanning direction, and a quantity of misalignment of the scale in the main scanning direction is also detected, by employing a color misalignment pattern (not shown). The CPU 201 computes the number of pixels that are either added or subtracted, based on the quantity of color misalignment (and the quantity of misalignment of the scale) that is detected in the operation of the detection of the quantity of color misalignment on the one hand, and the scaling factor correction table on the other, and performs the correction thereupon.

Following is a description using a specific instance.

As an instance, a circumstance will be described hereinafter wherein the scaling factor correction table is created for magenta (M), such as is depicted in FIG. 9B, and the correction is made for the base color yellow (Y).

As a further condition, a circumstance is presumed wherein a total number of pixels of one line image is 4000 pixels, and the magenta image is detected to be shortened by 300 supplemental pixels, with the yellow image as the baseline thereof, and the size of the supplemental pixel is that of a ($\frac{1}{16}$) pixel and one pixel is 16 bits. In the present circumstance, the number of the supplemental pixels to be added is 300. The supplemental pixels in the present circumstance would correspond to one bit as depicted in FIG. 8A to FIG. 8C, as an instance. The determination of the number of supplemental pixels is performed by the operation in step S15. To begin with, the number of supplemental pixels that are added to each region is derived for a circumstance wherein the 300 supplemental pixels are equally allocated to each of the regions 91 to 96 that are depicted in FIG. 9A, that is, 300/6=50.

Given that the value is strictly a theoretical value, the number of supplemental pixels that is either added to, or subtracted from, each respective region, is calculated in accordance with the scaling factor of the scaling factor correction table. As an instance, taking the circumstance depicted in the instance in FIG. 9B, the number that is allocated to each respective region is divided by the scaling factor in each respective region, with the result thereof being rounded off to the nearest integer if the division thereof is not even. The total number of supplemental pixels is adjusted so as to come to 300, as an instance, as per the preceding description.

The supplemental pixels are added as follows, respectively:

535 supplemental pixels to the region 91;
40 supplemental pixels to the region 92;
63 supplemental pixels to the region 93;
70 supplemental pixels to the region 94;
58 supplemental pixels to the region 95; and
34 supplemental pixels to the region 96.

The scale correction is thus performed on a per region basis for each respective region by adding the number of the supplemental pixels that is derived such as per the preceding to each respective region. Whereas the preceding instance depicts the application only to the magenta (M) image data, the control is performed in a similar manner for the other colors as well.

When the scaling correction and correction of the location of the writing out of image data are thus corrected, and the setting thereof is completed, the process proceeds to step S17, and the process waits for a print start instruction to be issued. When the print start instruction is inputted by either the PC 106 or the console unit 151, the process proceeds to step S18 and an image forming operation to be described hereinafter is performed.

In the present circumstance, the operation to add the supplemental pixels is performed, and the scale adjusted, on the per region basis as per the preceding description. It is thus possible to perform the scale adjustment for each respective color, taking into account the optical characteristic, when forming the image. When the image forming operation is completed, the sequence terminates. In addition, the sequence is executed once more in a similar manner, beginning with step S16, when the color misalignment correction operation is performed in the course of the image forming operation.

Whereas the preceding instance describes the circumstance wherein 300 supplemental pixels are added to a main scanning line at a time, it is to be understood that the number of pixels thus added is not restricted thereto.

In addition, whereas the preceding embodiment describes the circumstance wherein the supplemental pixels are added, the preceding embodiment is also applicable to a circumstance wherein 300 supplemental pixels are subtracted from a main scanning line at a time, as an instance. In such a circumstance, the number of supplemental pixels that is derived using the calculation described herein will be subtracted respectively from each corresponding region.

Following is a description of the image formation operation using the color image forming apparatus described herein.

When the signal for commencing the formation of the image is issued from either the PC 106 that is connected to the image forming apparatus, or the console unit 151 that is attached to the image forming apparatus, a paper feed operation commences from either a selected cartridge or the manual feed tray. As an instance thereof, when describing the circumstance wherein a sheet is fed from the cartridge, a sheet P is first conveyed one at a time from the cartridge by the pick-up roller. The sheet P is thereafter guided along a feed guide 18 to a location of a registration roller 19. Thereupon a rotation of the registration roller 19 is interrupted, and an edge of the sheet P strikes a nip portion. Thereafter, the rotation of the registration roller 19 begins, in accordance with a timing signal whereby the image formation unit commences the formation of the image. The timing of the rotational period thereof is set such that the sheet P and the toner image that is primary transferred upon the intermediate transfer belt 8 from the image forming unit exactly match, with respect to a secondary transfer portion.

Meanwhile, when the signal to commence the image formation operation is issued, the image forming unit forms an electrostatic latent image upon a photosensitive drum of each respective color. An image formation timing in the sub scanning direction is decided and controlled in accordance with a distance through each respective image forming unit in sequence from the photosensitive drum 2a, which is at the beginning of the sequence, in the direction of rotation of the intermediate transfer belt 8. A timing whereby the photosensitive drum of each respective color writes out the image in the main scanning direction involves employing a beam detection (BD) sensor signal, which is positioned upon the black (Bk) photosensitive drum according to the embodiment, to generate and control a pseudo beam detection (BD) sensor signal. In such a circumstance, the control determines whether to add or subtract a pixel in accordance with each respective location that is segmented in the main scanning direction, from the data of a color misalignment correction table and the data of the quantity of the color misalignment. The scale of the main scanning line is thereby adjusted, and the scale of the formation of the image of each respective color is thereby adjusted as well. The electrostatic latent image that is thus formed is developed by way of the process described herein. The toner image that is formed upon the photosensitive drum 2a, which is at the beginning of the sequence, is primary transferred by the transfer roller 5a, whereto a high voltage has been applied, to the intermediate transfer belt 8 in a primary transfer region. The toner image that is primary transferred thereby is next conveyed to the transfer roller 5b. The image formation of magenta image is performed on the photosensitive drum 2b at the delayed timing of the interval between the photosensitive drums 2a and 2b. Thus, the registration is aligned upon the yellow (Y) image and the magenta (M), and the magenta toner image is transferred on the yellow toner image. Thereafter, in similar manner, ultimately all four color toner images are primary transferred and overlaid one upon the other upon the intermediate transfer belt 8.

Thereafter, when the sheet P is conveyed into a secondary transfer region, that is, the secondary transfer roller 12, and makes contact with the intermediate transfer belt 8, the high voltage is applied to the secondary transfer roller 12, in accordance with a timing whereby the sheet P passes upon the intermediate transfer belt 8. The four color toner images that are formed upon the intermediate transfer belt 8 are thus transferred, that is, secondary transferred, upon the surface of the sheet P. After the secondary transfer thereof, the sheet P is accurately guided to a nip portion of fixing rollers in the fixing unit 16. The toner is then fixed upon the sheet P by the heat of the fixing film 16a and the pressing roller 16b, together with the pressure of the nip thereof. Thereafter, the sheet P is conveyed by the discharge roller 21 and discharged out of the apparatus, whereupon the sequence of the image formation operations is completed.

Whereas the image formation is positioned from beginning to end in a yellow (Y), magenta (M), cyan (C), and black (Bk) sequence according to the embodiment, the sequence thereof is determined by the characteristic of the apparatus, and is not restricted thereto. In addition, whereas the description according to the embodiment is of the four color image forming apparatus, it would be possible to control the image forming apparatus in a similar manner even when a greater number of colors are added thereto.

In addition, the scaling quantity table that is depicted in FIG. 9B is created in accordance with the flowchart that is depicted in FIG. 11, according to the embodiment. It is to be understood, however, that it would be possible to perform a measurement of the optical characteristic with a laser scan unit, such as is depicted in FIG. 9A, and to compute the scaling quantity table from the characteristic thus measured. It would thereafter be possible to perform an equivalent control by storing the table thus computed from the characteristic thus measured in the memory and using the stored table when forming the image.

Other Embodiments

While embodiments of the present invention have been described in detail herein, it would be permissible to apply the present invention to a system that is configured from a plurality of devices, as well as to an apparatus that is formed from a single device.

It is to be understood that the present invention may be achieved by supplying a software program that implements the functions of the embodiments described herein to either the system or the apparatus, either directly or remotely, and a computer of the system or the apparatus loading and executing the program supplied thereto. In the present circumstance, the format of the software need not be that of a program, provided that the format of the software includes the function of the program.

Accordingly, the program code, which is installed upon the computer in order to implement the function process of the present invention with the computer, itself implements the present invention. That is to say, the claims of the present invention are also incorporated into the computer program itself that is intended to implement the function process of the present invention. In such a circumstance, the format of the program does not matter, provided that the format of the software includes the function of the program. The form of the program in such a circumstance might be such as a program or a script data that is supplied to an operating system.

A variety of media may be used as a recording medium for the purpose of supplying the program to the computer. An instance thereof would be such as a floppy disk, a hard drive, an optical disc, a magneto-optical (MO) disk, a CD-ROM, a CD-R, a CD-RW, a magnetic tape, a nonvolatile memory card, a ROM, or a DVD, that is, a DVD-ROM or a DVD-R.

As another method of supplying the program, it would be possible to supply the program by employing a browser upon a client computer to connect to a webpage upon the Internet, and downloading the program from the webpage to a hard drive or other recording medium. In such a circumstance, it would be permissible for the download to be either the computer program proper or a compressed file thereof that incorporates an automatic install function thereof. In addition, it would be possible to implement the supply of the program by segmenting the program code that configures the program of the present invention into a plurality of files, and to download each respective file from a different webpage. That is to say, a World Wide Web server that facilitates downloading the program file that is intended to implement the function process of the present invention upon the computer is also incorporated into the claims of the present invention.

In addition, it would also be permissible for the program of the present invention to take a form of being encrypted and stored upon a storage medium, such as a CD-ROM, and distributed to the user thereby. In such a circumstance, a user who satisfies a prescribed condition would be allowed to download key information that decrypts the encryption from a webpage on the Internet, with the key information thus downloaded being used to install the encrypted program upon the computer in an executable format.

In addition, it would be possible for the function of the embodiment to be implemented in a format other than the format wherein the function of the embodiment is implemented by the computer executing the program that is loaded from the storage medium. As an instance thereof, it would be possible for the operating system or other software running upon the computer to perform the actual processing, either in whole or in part, in accordance with an instruction of the program, and the function of the embodiment being implemented by the processing thereof.

It would further be permissible for the program that is loaded from the recording medium to be written to a memory that is installed into a function expansion board that is installed in the computer, or into a function expansion unit that is connected to the computer. In such a circumstance, thereafter, a CPU or other hardware that is installed into the function expansion board or the function expansion unit performs the actual processing, either in whole or in part, in accordance with the instruction of the program, and the function of the embodiment is implemented by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-178806, filed Jul. 6, 2007, which is hereby incorporated by reference herein in its entirety.

What is claimed is:

1. An image processing apparatus for adjusting an image that is formed by image data of a main scanning line, by either adding pixels to the image data or deleting pixels from the image data, the image processing apparatus comprising:
    a first image forming unit configured to segment an image area of the main scanning line into a plurality of regions and form a first image having a first number of pixels in each of the plurality of regions;
    a second image forming unit configured to form a second image having a second number of pixels that differs from the first number of pixels, in each of the plurality of regions;
    an arithmetic unit configured to derive a scaling factor of an image in each of the plurality of regions, in accordance with a difference in size between the first image and the second image in each of the plurality of regions, and a differential between the first number of pixels and the second number of pixels;
    a determination unit configured to determine the number of supplemental pixels to be either added to, or subtracted from, each of the plurality of regions, based on a total number of correction pixels that are either added to, or subtracted from, the image area of the main scanning line, and the scaling factor that is derived by said arithmetic unit; and
    an image correction unit configured to correct the image data that is formed in each of the plurality of regions, in accordance with the number of supplemental pixels determined by said determination unit.

2. An apparatus according to claim 1, wherein the second image is either an enlarged image or a reduced image of the first image.

3. An apparatus according to claim 1, wherein the number of correction pixels that are either added to, or subtracted from, the image area of the main scanning line is decided in accordance with a differential of a total number of pixels of the image area of the main scanning line, and a length of an image formed based on the total number of pixels on the main scanning line.

4. An apparatus according to claim 1, wherein said determination unit determines the number of supplemental pixels that is either added or subtracted in accordance with the number that is a result of dividing the number of correction pixels by the number of regions, and the scaling factor in each of the plurality of regions.

5. An apparatus according to claim 1, wherein the image data comprises pixel data of x bits; and
    said image correction unit adds at least one bit in an arbitrary location of a pixel in each of the plurality of regions, and corrects image data in each region such that the number of bits of the image data reaches the number of the supplemental pixels determined by said determination unit, by sequentially performing, upon a following pixel of the pixel whereto the at least one bit has been added, an operation that shifts, and inserts into the following pixel, a number of bits that are made to overflow owing to the bits that are added thereto from a first bit of the following pixel, thereby creating image data wherein the number of the pixels thereof is increased.

6. An apparatus according to claim 1, wherein the image data comprises pixel data of x bits; and
    said image correction unit subtracts at least one bit from an arbitrary location of a pixel in each of the plurality of regions, and corrects image data in each region such that the number of bits of the image data reaches the number of the supplemental pixels determined by said determination unit, by sequentially performing, upon a following pixel of the pixel wherefrom the al least one bit has been subtracted, an operation that shifts, and inputs into the following pixel, a number of bits that are reduced owing to the bits that are subtracted therefrom from a first bit of the following pixel, thereby creating image data wherein the number of the pixels thereof is decreased.

7. An apparatus according to claim 1, further comprising:
a plurality of image forming units configured to respectively form an image of a different color;
wherein said determination unit determines the number of supplemental pixels in each of the plurality of regions, with respect to all except a single image forming unit from among the plurality of image forming units, in accordance with the scaling factor that is obtained with the single image forming unit from among the plurality of image forming units, and a relation between a location of the single image forming unit and locations of the other image forming units.

8. A control method of an image processing apparatus for adjusting an image that is formed by image data of a main scanning line, by either adding pixels to the image data or deleting pixels from the image data, the control method comprising the steps of:
segmenting an image area of the main scanning line into a plurality of regions and forming a first image having a first number of pixels in each of the plurality of regions;
forming a second image having a second number of pixels that differs from the first number of pixels, in each of the plurality of regions;
deriving a scaling factor of an image in each of the plurality of regions, in accordance with a difference in size between the first image and the second image in each of the plurality of regions, and a differential between the first number of pixels and the second number of pixels;
determining the number of supplemental pixels to be either added to, or subtracted from, each of the plurality of regions, based on a total number of correction pixels that are either added to, or subtracted from, the image area of the main scanning line, and the scaling factor that is derived in said deriving step; and
correcting the image data that is formed in each of the plurality of regions, in accordance with the number of supplemental pixels determined in said determining step.

9. A method according to claim 8, wherein the second image is either an enlarged image or a reduced image of the first image.

10. A method according to claim 8, wherein the number of correction pixels that are either added to, or subtracted from, the image area of the main scanning line is decided in accordance with a differential of a total number of pixels of the image area of the main scanning line, and a length of an image formed based on the total number of pixels on the main scanning line.

11. A method according to claim 8, wherein said determining step determines the number of supplemental pixels that is either added or subtracted in accordance with the number that is a result of dividing the number of correction pixels by the number of regions, and the scaling factor in each of the plurality of regions.

12. A method according to claim 8, wherein the image data comprises pixel data of x bits; and
said correcting step adds at least one bit in an arbitrary location of a pixel in each of the plurality of regions, and corrects image data in each region such that the number of bits of the image data reaches the number of the supplemental pixels determined in said determining step, by sequentially performing, upon a following pixel of the pixel whereto the at least one bit has been added, an operation that shifts, and inserts into the following pixel, a number of bits that are made to overflow owing to the bits that are added thereto from a first bit of the following pixel, thereby creating image data wherein the number of the pixels thereof is increased.

13. A method according to claim 8, wherein the image data comprises pixel data of x bits; and
said correcting step subtracts at least one bit from an arbitrary location of a pixel in each of the plurality of regions, and corrects image data in each region such that the number of bits of the image data reaches the number of the supplemental pixels determined in said determining step, by sequentially performing, upon a following pixel of the pixel wherefrom the al least one bit has been subtracted, an operation that shifts, and inputs into the following pixel, a number of bits that are reduced owing to the bits that are subtracted therefrom from a first bit of the following pixel, thereby creating image data wherein the number of the pixels thereof is decreased.

* * * * *